April 12, 1949.                    H. P. HOOD                    2,466,849
                              MOLDED GLASS ARTICLE
Filed Jan. 3, 1944                                              3 Sheets-Sheet 1

Inventor
HARRISON P. HOOD
By G. N. Knight
Attorney

April 12, 1949. H. P. HOOD 2,466,849
MOLDED GLASS ARTICLE
Filed Jan. 3, 1944 3 Sheets-Sheet 3
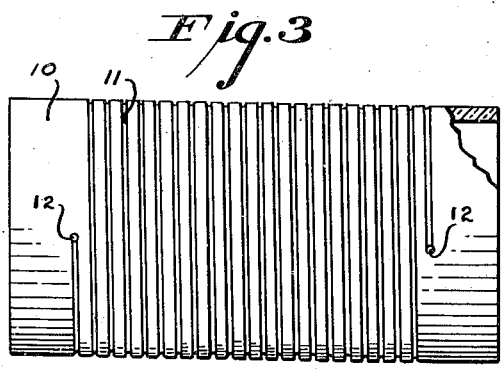
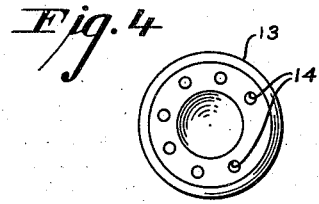
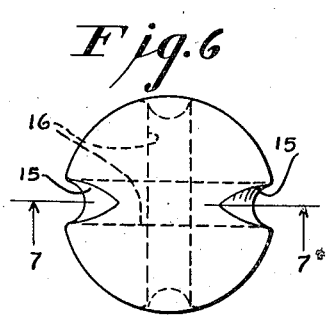
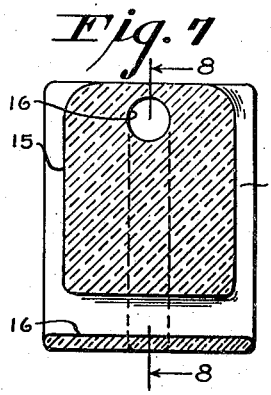
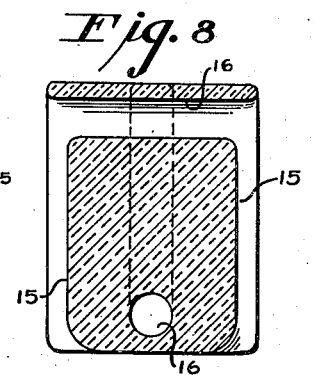
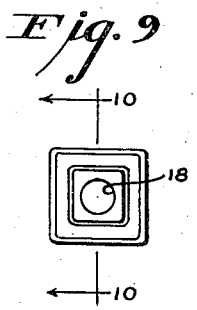
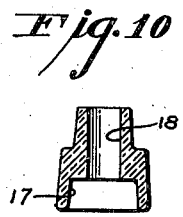
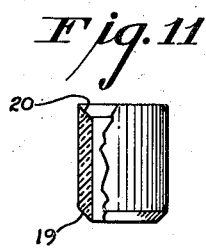
Inventor
HARRISON P. HOOD
By F. H. Knight
Attorney Patented Apr. 12, 1949

2,466,849

UNITED STATES PATENT OFFICE 2,466,849

MOLDED GLASS ARTICLE

Harrison P. Hood, Corning, N. Y., assignor to Corning Glass Works, Corning, N. Y., a corporation of New York Application January 3, 1944, Serial No. 516,794

4 Claims. (Cl. 106—54)

This invention relates to the molding or shaping of glass articles and particularly to the molding of intricate glass shapes the production of which has heretofore been impossible because the physical properties of glass place certain limitations on the prior methods. Ordinary shaping methods for the molding of molten glass are not adapted for making some articles, for example, articles of substantial thickness having reticulated designs and small perforations, because any implement employed for making fine perforations in molten glass becomes red-hot and either adheres to the glass or is burned off. These difficulties might be avoided if the glass could be machined or molded while cold, but glass per se is not machinable and although it can be sawed and drilled by special devices, such methods would be very costly and would not suffice for fine delicate patterns.

The primary object of this invention is to make perforated or reticulated glass articles.

Another object is to form such shaped articles by powdering a glass, molding the powder under pressure and sintering the compacted powder to a vitreous non-porous body.

A further object is to provide glass bodies comprising vitreous, non-porous, sintered, powdered glass.

Still another object is to provide glass compositions which are particularly suitable for powdering, compacting and sintering and which will not devitrify nor undergo substantial change in expansion coefficient when so treated.

I have discovered that many shapes and sizes of glass articles, which could not heretofore be produced, can now be made by such methods provided the compositions employed fall within certain limits. These compositions may be defined generally as alkali metal borosilicates comprising from 60% to 83% $SiO_2$, from 0 to 6% $Al_2O_3$, from 1% to 21% $R_2O$ (alkali metal oxide), and from 8% to 39% $B_2O_3$, the ratio $R_2O/B_2O_3$ being less than 1.1.

Several difficulties had to be overcome in the adaptation of glass to such methods of procedure. The most serious difficulty consisted in the tendency of the powdered glass to devitrify during firing. Glasses, which in massive form were known to be highly resistant to devitrification by heat, crystallized and became worthless when pulverized and heated at sintering temperatures. The expansion coefficient of the glass, hitherto considered to be a substantially unchangeable characteristic of glass, was also altered and in extreme cases increased more than three fold. Thus it was apparent that fine subdivision of glasses which are normally stable to heat results in serious loss of stability and change in expansion coefficient when heated. This fact was not hitherto known or appreciated.

For determining the suitability of any composition for my purpose, the following procedure was used. The glass was pulverized by being ground in a ball mill for about three hours or until 90% or more of the particles were of a fineness sufficient to pass a 100 mesh screen. The pulverized glass was then mixed with a binder comprising about 0.5% by weight of cellulose nitrate dissolved in sufficient amyl acetate to make the powder coherent when pressed but not sticky. The batch was molded under about 7000 pounds pressure into small rectangular bars about 10 cm. long, which were bluntly pointed at each end. After drying, the bars were fired at a temperature about 10° C. above the softening temperature of the glass. At fifteen minute intervals one of the bars was removed from the furnace for test and the expansion coefficient was measured by means of the well known dilatometer method. Fifteen minutes sufficed to sinter the powdered glass and convert the pulverulent material to a vitreous non-porous glass body provided the powdered glass did not devitrify. The tendency for the glasses to devitrify increased as the heating was prolonged. Some glasses devitrified badly in fifteen minutes. For most glasses, the expansion coefficient following a fifteen minute heating was increased at least slightly while in extreme cases the expansion coefficient was doubled or tripled in the same length of time. Glasses, in which there is no change of expansion coefficient after fifteen minutes sintering or in which the change of expansion coefficient from that of the original glass amounts to not over $5 \times 10^{-7}$ per degree C., are suitable for my purpose.

The following compositions which were calculated from their respective batches in percent by weight are examples of glasses falling within the scope of my invention and are suitable for making reticulated and filigreed glass articles:

Table I

|  | 1 | 2 | 3 | 4 | 5 | 6 | 7 | 8 | 9 |
|---|---|---|---|---|---|---|---|---|---|
| $SiO_2$ | 82.5 | 77.5 | 80 | 77.5 | 70 | 79 | 74 | 81 | 80 |
| $K_2O$ | 2.5 | 10 | 10 | 5 | 15 | 2.5 | 10 | 2.5 | 5 |
| $B_2O_3$ | 15 | 12.5 | 10 | 17.5 | 15 | 18.5 | 15 | 15.5 | 11 |
| $Al_2O_3$ |  |  |  |  |  |  | 1 | 1 | 4 |
| Sinter Temp. °C | 862 | 862 | 884 | 813 | 827 | 844 | 818 | 915 | 925 |
| Exp.×10⁻⁷ of original glass | 24 | 51 | 51 | 33 | 66 | 28 | 49 | 27 | 35 |
| Exp. after 15 minutes at sinter temp | 29 | 55 | 54 | 35 | 67 | 28 | 50 | 29 | 36 |

Table II

|  | 10 | 11 | 12 | 13 | 14 | 15 | 16 | 17 |
|---|---|---|---|---|---|---|---|---|
| $SiO_2$ | 77.5 | 75 | 70 | 72.5 | 70 | 71 | 77 | 76 |
| $Na_2O$ | 2.5 | 5 | 15 | 5 | 10 | 10 | 2.5 | 5 |
| $B_2O_3$ | 20 | 20 | 15 | 22.5 | 19 | 15 | 18.5 | 13 |
| $Al_2O_3$ |  |  |  |  | 1 | 4 | 2 | 6 |
| Sinter Temp., °C | 813 | 774 | 735 | 764 | 739 | 746 | 795 | 823 |
| Exp.×10⁻⁷ of original glass | 28 | 36 | 72 | 36 | 67 | 57 | 42 | 40 |
| Exp. after 15 minutes at sinter temp | 30 | 39 | 76 | 36 | 67 | 57 | 42 | 40 |

The compositions shown in Table I contain potash as the alkali metal oxide and the compositions of Table II contain soda. It will be noted that some of the compositions contain $Al_2O_3$. I have found that although the range of suitable compositions is smaller in the soda borosilicate system than it is in the potash borosilicate system, the addition of $Al_2O_3$ in amounts up to 6% or so to the soda system enlarges or extends its range of useful glasses to substantially equal that of the potash system. $Al_2O_3$ can also, if desired, be added to the potash glasses with some advantage. In all cases it decreases the tendency of the glass to undergo a change in expansion coefficient when powdered and sintered. All glasses which are melted in aluminous refractories will contain dissolved alumina which may amount to a tenth percent or more.

In order that the invention may more readily be understood, reference is had to the accompanying drawings in which Fig. 1 is a triaxial diagram representing the system $SiO_2+Al_2O_3:K_2O:B_2O_3$ and showing compositions in this system which are suitable for use in the practice of my invention. These are defined by the area enclosed by the straight lines AD, AB and BC, and the curved line CD. The compositions which are set forth above in Table I fall within this area. The maximum $SiO_2$ content for suitable glasses in this system is not constant, as is indicated by the curved line CD. The straight line CE is, therefore, employed as the closest approximation to the average upper limit for $SiO_2$ in order to facilitate defining the field of useful glasses. On this basis, it will be seen that the useful glasses in this system contain from 60% to 83% $SiO_2$. The points A and B indicate that the $K_2O$ contents of these glasses are from 1% to 21% and the points A and C place the limits of $B_2O_3$ from 8% to 39%. As hereinbefore pointed out, if desired, $Al_2O_3$ may be present in amounts up to 6% or so.

The straight line BC, if extended, would pass through the $SiO_2+Al_2O_3$ apex and the point on the $K_2O$, $B_2O_3$ axis representing 52.4% $K_2O$, 47.6% $B_2O_3$. This line therefore represents a constant ratio for $K_2O/B_2O_3$. In the present instance this ratio is 1.1 and for all compositions located to the right of the line BC the value of this ratio is less than 1.1.

Fig. 2 is a triaxial diagram representing the system $SiO_2+Al_2O_3:Na_2O:B_2O_3$ and showing compositions in this system which are suitable for use in the practice of my invention. The area enclosed by the straight lines MS, MN and NO and the curved line OS represents approximately the compositions in the soda borosilicate system without substantial $Al_2O_3$ which I have found useful for my purpose. As hereinbefore pointed out, the addition of $Al_2O_3$ to this system of glasses extends the range of useful compositions. This improvement has been shown in Fig. 2 for glasses containing 1% and 6% $Al_2O_3$. The addition of 1% $Al_2O_3$ to these glasses extends the field to include also the area bounded by the curved lines OS and OPS. The further addition of $Al_2O_3$ up to 6% or so further extends the field to include the area bounded by the curved lines PS and PRS. For convenience, the straight line RT may be used as an approximation of the curved line RS for defining the average maximum silica content of the glasses of this system. The compositions of Table II fall within the area thus described.

It will be noted that the area MNRT is identical with area ABCE of Fig. 1. Using the same method of definition, the area MNRT is therefore defined as comprising from 60% to 83% $SiO_2$, from 0 to 6% $Al_2O_3$, from 1% to 21% $Na_2O$ and from 8% to 39% $B_2O_3$.

The straight line NOPR, if extended, would pass through the $SiO_2+Al_2O_3$ apex and the point on the $Na_2O$, $B_2O_3$ axis representing 52.4% $Na_2O$, 47.6% $B_2O_3$. This line, therefore, represents a constant ratio for $Na_2O/B_2O_3$. All compositions which are located on the line NOPR have the ratio $Na_2O/B_2O_3$ equals 1.1 and for all compositions which are located to the right of the line NOPR the value of this ratio is less than 1.1.

The above described glass compositions, when powdered, molded and sintered may be fabricated into a variety of shaped glass articles which are non-porous, vitreous bodies having accurately contoured perforations, reticulations and the like. Compositions which lie outside of the described ranges tend to crystallize when so treated and their expansion coefficients are increased to such an extent that they are relatively useless for the intended purpose.

Fig. 3 further illustrates my invention and shows by way of example a side elevation of a coil form made thereby and comprising a tubular glass cylinder 10 provided on its exterior surface with a helical wire receiving groove 11 and anchor holes 12.

Fig. 4 is a plan view of a sintered glass base for a small radio tube which comprises a recessed disc 13 provided with a beveled edge and a plurality of fine holes 14.

Fig. 5 is a plan view of a button which in appearance closely resembles those buttons which are so well known to the general public and which are known as "pearl" buttons.

Fig. 6 is a top plan view of an insulator of the type known as a strain insulator. It comprises a solid glass body of general cylindrical shape provided with grooves 15 and wire receiving holes 16.

Fig. 7 is a sectional view on the line 7—7 of Fig. 6.

Fig. 8 is a sectional view on the line 8—8 of Fig. 7.

Fig. 9 is a plan view of a bushing for insulating a bolt in a transformer.

Figure 1:
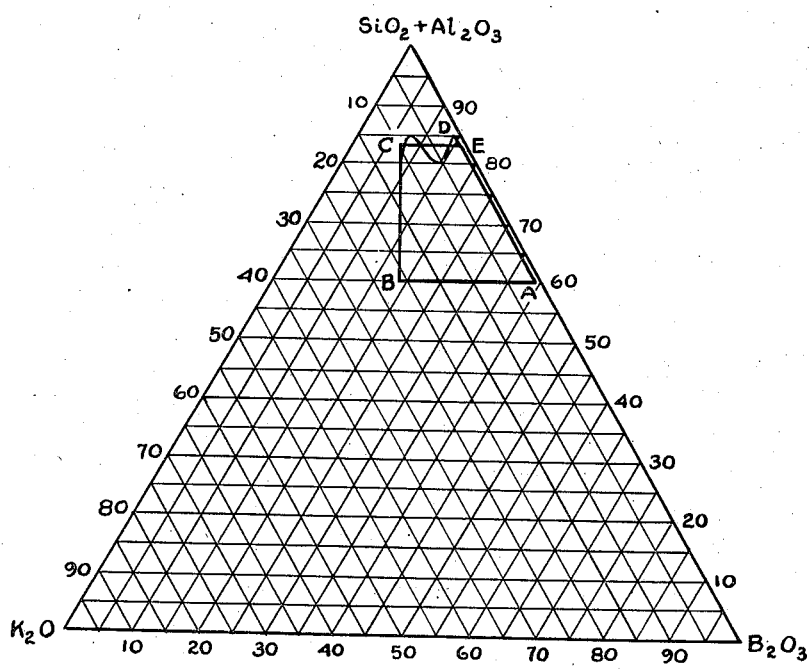
Figure 2:
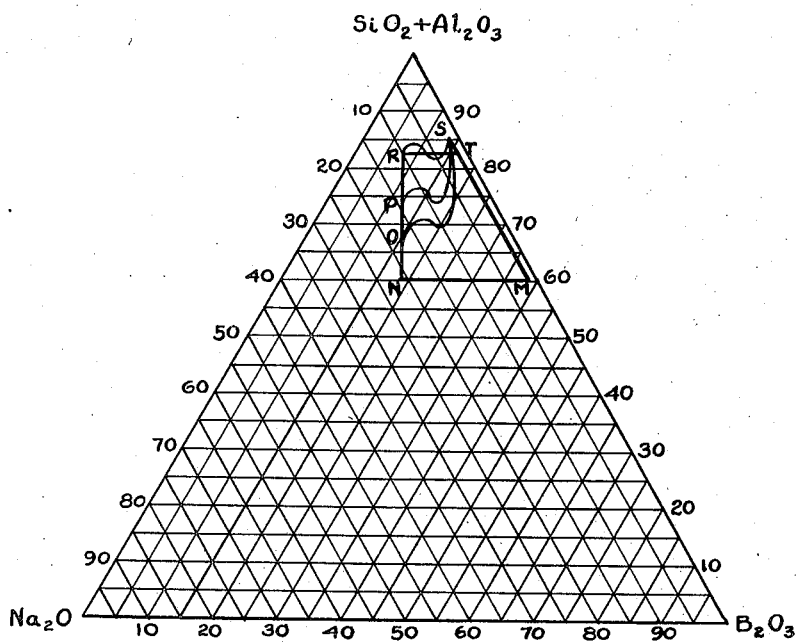

Fig. 10 is a sectional view on the line 10—10 of Fig. 9, which shows that the bushing is provided with a square recess 17 for receiving the head of the bolt and a central hole 18 to give passage to the bolt itself.

Fig. 11 is a side elevation, partly in section, of a bushing for insulating a wire. The bushing comprises a small hollow cylinder of sintered glass one end being provided with an outer bevel 19, the other end being provided with an inner bevel 20. Such bushings may be used in coaxial cables and the like.

A suitable procedure for making reticulated glass articles according to my invention is as follows. The glass is pulverized and ground, preferably in a ball mill using silica or porcelain balls until at least 50% of it will pass through a 200 mesh screen. To the powdered glass is added a solution or liquid comprising an organic binder amounting to about .5% to 2% by weight of the glass and the solvent being sufficient to dampen the glass powder and wet the particles thereof or equivalent to about 15 cc. per 100 grams of glass. Gelatin dissolved in water or cellulose nitrate dissolved in amyl acetate are preferred as binders, but others may be used.

The thoroughly dampened batch is permitted to dry somewhat until it will cohere when pressed, but will not adhere to the mold or plunger. In this condition it appears dry but is definitely coherent. If water was used as the solvent, the residual moisture at this stage will amount to about .25% to 1.5% by weight of the glass. The batch is pressed in a mold of the desired configuration, preferably under a pressure of about two tons per square inch.

The pressed article is then dried and heated at a temperature near the softening point of the glass, preferably within ±25° to 50° C. of the softening point until the particles are fused together to form a substantially continuous glassy structure. A heating time of not more than fifteen minutes will usually suffice.

I claim:

1. A shaped glass article having accurately contoured perforations, reticulations and the like formed by compressing into the desired shape a finely pulverized glass falling within the composition range 60% to 83% $SiO_2$, 0 to 6% $Al_2O_3$, 1 to 21% $R_2O$, and 8% to 39% $B_2O_3$, the ratio $R_2O/B_2O_3$ being less than 1.1 and sintering the shape into a dense non-porous article, the coefficient of expansion of the sintered article not exceeding the coefficient of expansion of the glass before pulverizing and sintering by more than .0000005 per °C.

2. A shaped glass article having accurately contoured perforations, reticulations and the like formed by compressing into the desired shape a finely pulverized glass falling within the composition range 60% to 83% $SiO_2$, 0 to 6% $Al_2O_3$, 1 to 21% $K_2O$, and 8% to 39 $B_2O_3$, the ratio $K_2O/B_2O_3$ being less than 1.1 and sintering the shape into a dense non-porous article, the coefficient of expansion of the sintered article not exceeding the coefficient of expansion of the glass before pulverizing and sintering by more than .0000005 per °C.

3. A shaped glass article having accurately contoured perforations, reticulations and the like formed by compressing into the desired shape a finely pulverized glass falling within the composition range 60% to 83% $SiO_2$, 0 to 6% $Al_2O_3$, 1% to 21% $Na_2O$, and 8% to 39% $B_2O_3$, the ratio $Na_2O/B_2O_3$ being less than 1.1 and sintering the shape into a dense non-porous article, the coefficient of expansion of the sintered article not exceeding the coefficient of expansion of the glass before pulverizing and sintering by more than .0000005 per °C.

4. The method of making glass articles which comprises preparing a finely pulverized glass the composition of which lies within the range 60% to 83% $SiO_2$, 0 to 6% $Al_2O_3$, 1% to 21% $R_2O$, and 8% to 39% $B_2O_3$, the ratio $R_2O/B_2O_3$ being less than 1.1, forming the pulverized glass into the desired shape and sintering it into a dense non-porous article.

HARRISON P. HOOD.

REFERENCES CITED

The following references are of record in the file of this patent:

UNITED STATES PATENTS

| Number | Name | Date |
|---|---|---|
| 1,623,301 | Brenner | Apr. 5, 1927 |
| 2,071,196 | Burger et al. | Feb. 16, 1937 |
| 2,193,640 | Navias | Mar. 12, 1940 |
| 2,197,562 | Reinker | Apr. 16, 1940 |
| 2,300,931 | Kalischer et al. | Nov. 3, 1942 |
| 2,390,354 | Clapp | Dec. 4, 1945 |

FOREIGN PATENTS

| Number | Country | Date |
|---|---|---|
| 481,067 | Great Britain | Mar. 4, 1938 |
| 115,092 | Australia | May 14, 1942 |